(12) United States Patent
Bettermann (10) Patent No.: US 10,443,638 B2
(45) Date of Patent: Oct. 15, 2019

(54) METHOD FOR FORMING AN ENGAGEMENT PORTION IN A WORKPIECE

(71) Applicant: Homag Bohrsysteme GmbH, Herzebrock-Clarholz (DE)

(72) Inventor: Thomas Bettermann, Bielefeld (DE)

(73) Assignee: Homag Bohrsysteme GmbH, Herzebrock-Clarholz (DE)

( * ) Notice: Subject to any disclaimer, the term of this patent is extended or adjusted under 35 U.S.C. 154(b) by 0 days.

(21) Appl. No.: 15/739,682

(22) PCT Filed: Jul. 6, 2016

(86) PCT No.: PCT/EP2016/065955
§ 371 (c)(1),
(2) Date: Dec. 22, 2017

(87) PCT Pub. No.: WO2017/005782
PCT Pub. Date: Jan. 12, 2017

(65) Prior Publication Data
US 2018/0187707 A1    Jul. 5, 2018

(30) Foreign Application Priority Data

Jul. 9, 2015 (DE) .......................... 10 2015 212 852

(51) Int. Cl.
*B29C 65/00*        (2006.01)
*B29C 65/48*        (2006.01)
(Continued)

(52) U.S. Cl.
CPC ............... *F16B 5/02* (2013.01); *B29C 39/10* (2013.01); *E04B 1/48* (2013.01); *F16B 13/14* (2013.01);
(Continued)

(58) Field of Classification Search
CPC ... B29C 65/48; B29C 65/4815; B29C 65/483; B29C 65/4845; B29C 65/562;
(Continued)

(56) References Cited

U.S. PATENT DOCUMENTS 2,389,464 A * 11/1945 Snyder ...................... E01B 9/16
238/366
2,690,879 A * 10/1954 Snyder ...................... E01B 9/16
156/92
(Continued)

FOREIGN PATENT DOCUMENTS

AT            364382 B      10/1981
DE    10-2005-059845 A1     6/2007
(Continued)

*Primary Examiner* — Philip C Tucker
*Assistant Examiner* — Brian R Slawski
(74) *Attorney, Agent, or Firm* — Morgan, Lewis & Bockius LLP (57) ABSTRACT

A method for forming an engagement portion in a workpiece is provided, said workpiece preferably consisting at least partially of wood, materials containing wood fibers, wood composite materials, veneer, plastics materials and combinations thereof. The method has the following steps of: providing the workpiece having a cutout, introducing a predetermined volume of a curable filling compound into the cutout and introducing an engagement element into the curable filling compound, wherein the engagement element has an engagement structure which at least partially represents a geometric counterpart to the engagement portion, the engagement portion takes up a predetermined position in the workpiece, and the engagement structure is arranged at least partially in the filling compound.

15 Claims, 4 Drawing Sheets

(51) Int. Cl.
*B29C 65/56* (2006.01)
*B29C 65/72* (2006.01)
*B32B 37/00* (2006.01)
*F16B 3/00* (2006.01)
*F16B 5/02* (2006.01)
*F16B 12/14* (2006.01)
*F16B 13/14* (2006.01)
*B29C 39/10* (2006.01)
*E04B 1/48* (2006.01)

(52) U.S. Cl.
CPC .......... *F16B 13/141* (2013.01); *B29C 65/483* (2013.01); *B29C 65/4815* (2013.01); *B29C 65/562* (2013.01); *B29C 65/72* (2013.01); *B29C 66/02242* (2013.01); *B29C 66/30325* (2013.01); *B29C 66/7487* (2013.01); *F16B 3/005* (2013.01); *F16B 12/14* (2013.01)

(58) Field of Classification Search
CPC ..... B29C 65/565; B29C 65/72; B29C 66/022; B29C 66/0224; B29C 66/02242; B29C 66/30325; B29C 66/114; B29C 66/7487; B29C 66/721; B29C 66/7212; B29C 66/303; F16B 5/02; F16B 12/04; F16B 13/02; F16B 13/141; F16B 13/142; F16B 13/14; F16B 2013/147; F16B 2013/007; F16B 3/00; F16B 3/005; F16B 12/00; F16B 12/14; F16B 12/16; Y10T 403/47; Y10T 403/472; Y10T 403/473
USPC .. 156/60, 71, 91, 92, 94, 98, 152, 153, 242, 156/245, 272.2, 272.8, 273.3, 275.5, 156/275.7, 293, 303.1, 307.1, 307.7, 325, 156/326, 328, 332, 336; 403/7, 265, 267; 428/524, 526, 528, 529; 52/309.3, 704
See application file for complete search history.

(56) References Cited

U.S. PATENT DOCUMENTS

| | | | | |
|---|---|---|---|---|
| 2,728,120 | A * | 12/1955 | Snyder | B27K 3/105 |
| | | | | 156/94 |
| 3,129,472 | A | 4/1964 | Hensel | |
| 3,716,608 | A * | 2/1973 | Neumann | E01B 9/04 |
| | | | | 144/365 |
| 3,756,635 | A * | 9/1973 | Beers | F16B 11/008 |
| | | | | 312/111 |
| 5,271,785 | A | 12/1993 | Devine | |
| 5,368,792 | A | 11/1994 | Short et al. | |
| 6,913,666 | B1 * | 7/2005 | Aeschlimann | B29C 65/56 |
| | | | | 156/303.1 |
| 7,070,376 | B1 | 7/2006 | Toback | |
| 2006/0113031 | A1 | 6/2006 | Langtry et al. | |
| 2013/0006278 | A1 | 1/2013 | Mayer et al. | |
| 2013/0065053 | A1 * | 3/2013 | Kikuchi | B29B 9/065 |
| | | | | 428/402 |

FOREIGN PATENT DOCUMENTS

| | | | |
|---|---|---|---|
| FR | 1164445 A | 10/1958 | |
| FR | 2852613 A1 * | 9/2004 | ............... E01B 9/16 |
| JP | S5261665 A | 5/1977 | |
| JP | H10202665 A | 4/1998 | |
| JP | 2009-204144 A | 9/2009 | |
| WO | WO-2011144282 A1 | 11/2011 | |

* cited by examiner

METHOD FOR FORMING AN ENGAGEMENT PORTION IN A WORKPIECE

FIELD OF THE INVENTION

The present invention relates to a method for forming an engagement portion, in particular a thread, in a workpiece, in particular of wood, materials containing wood fibers, wood composite materials, veneers, plastic materials and combinations thereof.

BACKGROUND

It is frequently common practice in furniture construction to prefabricate the individual parts of a furniture piece which are then combined into corresponding construction kits which are subsequently assembled on location. The workpieces used thereby often consist at least in sections of wood, or materials containing wood fibers as well as wood composite materials. Particle boards or MDF boards are cited as examples thereof.

To assemble the workpieces, common connecting elements such as screws for assembly are usually included in the construction kit in separate packages. During the assembly on location, these connecting elements are then used at the appropriate place.

This procedure is disadvantageous in several respects. Firstly, additional logistical effort is required from the producer of the furniture construction kit to pack the connecting elements into corresponding packages and to enclose these in the construction kit.

Furthermore, during the assembly of the furniture pieces, a greater amount of work is required since the connecting elements must be driven into the workpiece. Even if this is supported by a pilot hole in the prefabricated workpiece, in the interest of joint strength, a certain amount of physical effort is nevertheless required to suitably place the connecting elements.

In particular, if the furniture is assembled by a private person, there is often a lack of suitable tools as well as the necessary technical knowledge to ensure a stable connection. Furthermore, with this practice, it is unavoidable that precision suffers during assembly.

For example, if a screw as a connecting element is directly inserted into a workpiece consisting at least in sections of a wood such as a particle board, the strength of the connection is furthermore not always guaranteed. Particularly with particleboards, the phenomenon can often be observed that the screw tears or breaks out of its screw hole. This can be limited by the use of a suitable dowel; however, this in turn involves a further complicating of the assembly process as well as larger logistical requirements during the commissioning of the furniture construction kit.

SUMMARY OF THE INVENTION

The present invention has been devised in view of the above-described disadvantages and an objective of the present invention is to provide a method with which an engagement portion can be formed as simply as possible in a workpiece preferably consisting at least in sections of wood, materials containing wood fibers, wood composite materials, veneer, plastic materials and combinations thereof and which moreover guarantees a secure engagement with a corresponding engagement element and which facilitates the construction of different workpieces by means of the engagement element.

In this regard, the present invention provides a method according to claim 1. Further preferred embodiments are provided in the dependent claims. Furthermore, the invention is directed at a workpiece produced with this method.

In particular, a method for forming an engagement portion in a workpiece, said workpiece preferably consisting at least partially of wood, materials containing wood fibers, wood composite materials, veneers, plastic materials and combinations thereof, has the following steps: providing the workpiece with a cutout; introducing a predetermined volume of a curable filling compound into the cutout; pushing an engagement element having an engagement structure into the curable filling compound in such a way that the engagement structure is arranged at least partially in the filling compound.

With this method, an engagement portion which represents a "negative" of the engagement structure of the engagement element can be formed in the workpiece in a simple manner. Forming the engagement portion functions by simply pushing the engagement element into a curable filling compound and consequently functions in an especially simple and productive manner.

Furthermore, using a curable filling compound and pushing the engagement element into the curable filling compound guarantee that an especially durable and stable connection is formed between the workpiece and the filling compound as well as between the filling compound and the engagement element.

The hardening of the filling compound produces a type of interlocking effect between the then at least partially hardened filling compound and the structure of the workpiece into which the curable (i.e. the not-yet-hardened) filling compound penetrates. The penetration of the filling compound into the structure of the workpiece is supported by the engagement element being pushed into the filling compound, which correspondingly displaces the filling compound and partially forces it into the structure of the workpiece.

A corresponding effect is reached on sides of the engagement element where the filling compound penetrates into the engagement structure located on the engagement element and encloses and/or surrounds this. As a result, a very stable connection between workpiece, filling compound, and engagement element is acquired. The workpiece-filling compound-engagement-element connection is thereby preferably a form-fit connection. If a suitable filling compound is used, a cohesive connection is also conceivable, in particular with the connection between the filling compound and workpiece.

In doing so, after pushing the engagement element into the filling compound, a hardening of the filling compound commonly occurs without additional processing steps, just by the soft material cooling down with the cool ambient air. However, it is conceivable that, for example, cooling air is applied or a different hardening technique is used depending on the material in order to accelerate the hardening.

In addition to the prospect of producing an especially durable connection, the method introduces the possibility of simply leaving the engagement element in the workpiece after introduction into the filling compound (and the curing thereof). In doing so, workpieces are provided in which the engagement element is already incorporated. This can subsequently be processed further and, for example, assembled into a furniture construction kit.

On location, the user must only then remove the engagement element from the engagement portion formed in the workpiece. The user can then, for example, connect the workpiece to another workpiece and fix the arrangement by reinserting the engagement element into the engagement portion.

In this manner, logistical effort during the assembly of construction kits can be reduced. On the other hand, the likelihood of an operating error by the user is reduced since the user can revert to the finished engagement portion with the correct, i.e. the precisely fitting, engagement element.

Preferably, the engagement structure on the engagement element is an (outer) thread so that an (inner) thread is formed in the filling compound or in the workpiece as an engagement portion. This has the advantage that the engagement element can be simply and repeatedly engaged with and detached again from the engagement portion formed in the filling compound.

Preferably, the engagement element is held for a predetermined time in a predetermined position after being pushed into the curable filling compound, and preferably until the filling compound has at least partially hardened.

This ensures that the engagement portion is formed in the workpiece at the desired position and in the correct orientation.

Preferably the predetermined volume is adjusted such that it corresponds to the volume of the cutout minus the volumetric displacement of the engagement element in the filling compound.

In doing so, the filling compound can be optimally adjusted and therefore neither too much nor too little filling compound is used. Too much filling compound would possibly create the problem of the filling compound oozing out of the cutout during the pushing-in of the engagement element and hardening in this state, which could affect the appearance of the material as well as the further processing.

Additionally, as regards the predetermined volume, the amount penetrating into the workpiece when pushing the engagement element into the workpiece can be taken into account. This amount can be correspondingly added to the predetermined volume.

By taking into account the amount of the filling compound penetrating into the workpiece in predetermined volumes, the optimal filling amount of the filling compound can be adjusted still more precisely. The amount of the filling compound penetrating into the workpiece is essentially dependent on the structure, i.e. the porosity, of the workpiece. A larger amount of filling compound would penetrate into a rough particle board than would penetrate into a plastic material board.

The curable filling compound is preferably a paste-like compound.

This means that the compound has a paste-like consistency having a corresponding viscosity. This ensures the simple processing of the filling compound, in particular when introducing the filling compound into the cutout and guarantees that the curable filling compound as well as the engagement structure of the engagement element and also the structures of the workpieces can optimally "engulf" it or penetrate it.

Regarding the introduction of the filling compound, the method preferably has the following steps: feeding a granulate into an extruder and melting down the granulate in the extruder to form the curable filling compound.

The use of an extruder to feed and to melt down a granulate (i.e. to produce the curable filling compound) enables a simple preparation of the filling compound having the desired properties as well as the precise delivery thereof. Furthermore, by processing a granulate, a simple storage of the raw material is guaranteed.

Preferably, the granulate is a granulate which has wood material.

In addition to the high availability, one advantage of such a granulate lies in its very good recyclability.

The curable filling compound is preferably a thermoplastic compound which transforms into a thermoplastic state when heated and hardens during cooling. Furthermore, the method then comprises heating the filling compound before or during introduction into the cutout.

A filling compound of thermoplastic material thereby has the advantage of a simple processing. Furthermore, the desired material properties regarding viscosity and solidity can also be guaranteed in the not-yet-hardened (curable) state as well as in the hardened state. Due to the step of heating before introducing the filling compound, a suitable viscosity of the filling compound can be adjusted and therefore this filling compound is easy to process and also has the desired flow properties for penetrating into the engagement structure of the engagement element and the structure of the workpiece. Consequently, by using the thermoplastic compound, an especially secure engagement of the engagement element with the workpiece can be combined with a processing that is a simple as possible.

Furthermore, biodegradable thermoplastic materials are preferred. For example, these can be thermoplastic polyesters, such as, for example, polyhydroxyalkanoates, polyhydroxybutyrates, and polycaprolactone.

According to the preferred embodiments, the curable filling compound can be formed such that it can be hardened by an energy supply. The method then provides the additional step of hardening the curable filling compound by a supply of energy.

This energy can be, for example, heat energy, with energy being supplied to the material for example by laser, infrared, or microwave radiation. This energy supply can, for example, induce a cross-linking process in the material which hardens the filling compound.

Furthermore, the curable filling compound can also be constituted such that it can be formed from a raw mass by an energy supply. The method then furthermore has the steps of introducing the raw compound into the cutout and transforming the raw compound into the curable filling compound by an energy supply.

The raw compound thus can be formed, for example, from a granulate that is introduced into the cutout. Alternatively, a pre-formed "plug" in a raw state can be introduced into the cutout, which is then transformed into the curable filling compound by an energy supply. The energy supply can occur through laser, microwave, ultrasound, or infrared exposure.

The curable filling compound preferably has a mixture of biological polymers and natural fibers.

This has the advantage that all materials of the filling compound are biodegradable which greatly facilitates recycling of the workpiece after use. If necessary, the engagement element must only then be removed and the workpiece having the engagement portion can be recycled. The biological polymers or biopolymers can, for example, be produced from sugar by fermentative and polymer-chemical processes. In particular, the biopolymer (the biological polymer) has lignin which can be directly obtained, for example, from wood processing. To reinforce the hardened filling compound, for example, reinforcing fibers such as wood fibers, flax, hemp, sisal, jute, and other plant fibers can be present.

Additionally, natural resin, natural wax, natural oils, and cellulose can be present, with the aid of which, for example, the viscoelastic properties of the filling compound and the hardening and softening behaviors thereof can be adjusted. Additionally, polyhydroxyalkanoates, polyhydroxybutyrates, polycaprolactone, polyester and/or starch can be contained.

According to one preferred embodiment, the cutout furthermore has an indentation on the workpiece, with the indentation being dimensioned such that in this indentation at least the part of the engagement element that is protruding from the cutout can be accommodated such that the engagement element does not protrude beyond the contour of the workpiece.

This has the advantage that, despite introducing the engagement element, there are no protruding parts, which facilitates the storage, packaging, and transportation.

Further preferred, the cutout has an undercut relative to the direction that the engagement element is pushed into the filling compound.

This has the advantage that, after the filling compound has hardened, an especially strong connection between the workpiece and the filling compound is created since, due to the undercut, the hardened filling compound functions similar to a barb in the workpiece.

Additionally/alternatively, in the walls of the cutout, one groove or plural grooves in the workpiece can be formed which run obliquely (in particular perpendicularly) to the pushing-in direction of the engagement element and are cut into the walls of the cutout. The grooves can be provided in a parallel arrangement. Alternatively, a groove is formed thread-like or runs helically.

Also by doing so, a strong connection between workpiece and filling compound can be promoted since the hardened filling compound engages with the grooves. The grooves can thereby be formed fully or in sections in the peripheral direction of the cutout.

The engagement element is preferably a screw which furthermore preferably has a countersunk head or a round head. The latter is then advantageous if, for example, the workpiece provided with the engagement element is to be stacked.

Furthermore, it is preferred if the screw has a deep thread, for example, in the shape of a self-tapping thread since the hardened filling compound can then engage well with the screw.

DETAILED DESCRIPTION

Preferred embodiments of the present invention will be described in detail below with reference to the accompanying drawings. Further modifications cited in this connection can each be combined with one another to form new embodiments.

In the partial FIGS. 1A to 1C, FIG. 1 represents the essential steps of a method according to the invention for forming an engagement portion in a workpiece 10. An inner thread to be formed on or in the workpiece 10 is considered here to be an example of the engagement portion.

Figure 1A:
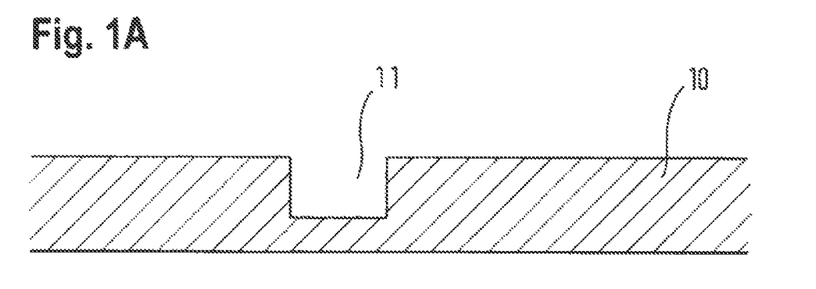
FIGS. 1A to 1C schematically present the different steps of one embodiment of the method according to the invention, with cross-sections in different stages of the method being shown in each.

Firstly, as shown in FIG. 1A, a workpiece 10 is provided which has a cutout 11. In the next step, a curable but not-yet-hardened filling compound 20 is introduced into this cutout 11.

In this case, "curable" means that the filling compound can change its viscoelastic properties by a hardening process to the extent that in the hardened state, under normal conditions, it no longer displays viscoelastic flow properties, and its form also does not change by itself at least in a stress-free condition (i.e. without additional external forces). In the hardened state, it is furthermore preferred that the hardened filling compound either withstands the occurring stresses or breaks, i.e. in particular it does not display plastic flow such as an expansion increase without a simultaneous tension increase (whereas a limited elastic deformation under stress can certainly be desirable for several uses).

"Not-yet-hardened" designates a state in which the filling compound has viscous properties and can be plastically deformed into the material without too great a permanent tension increase (essentially without a permanent tension increase). However, it is simultaneously preferred that the filling compound is not completely fluid since this would make introducing the filling compound into the cutout more difficult. In this "not-yet-hardened" (curable) state, the filling compound can consequently be designated, for example, as "paste-like" or "gel-like". It is thereby especially preferred if the viscoelastic properties of the curable filling compound state are adjusted such that the filling compound does not essentially flow, for example, under the influence of gravity at least until introduction of the engagement element (until the start of the hardening process). This enables the filling compound to be processed "overhead" or on an inclined workpiece.

It is simultaneously preferred that the viscosity is at least initially so low that the filling compound can at least partially penetrate into the rough surface of the cutout 11 in the workpiece and can "mesh" with the workpiece during hardening. The "rough surface" is considered to be the cut edges of particle boards that are often rough.

For example, a suitable viscosity range for the not-yet-hardened filling compound is from 20,000 mPas to 100,000 mPas. However, other viscosities can also be used depending on the specific application.

During introduction into the cutout 11, the filling compound 20 has a predetermined volume V. After introducing the filling compound 20, an engagement element 30 is pushed into the not-yet-hardened filling compound 20. As depicted in the example of the screw shown in FIG. 1C, the engagement element 30 has an engagement structure (presently the outer thread of the screw) in the hardened filling compound, that represents the geometric counterpart or negative to the engagement portion (presently an inner thread) that is to be formed in/on the workpiece.

The cutout 11 is preferably limited by the workpiece 10 at least on the bottom side. The cutout 11 depicted in the drawings is milled into the workpiece 10, for example, in the shape of a straight circular cylinder. However, any arbitrary different shape of the cutout can be used according to the requirement and the application (for example, a cuboid cutout or a cutout having a generally polyhedral cross-section, as well as a conically tapered cutout).

Figure 1B:
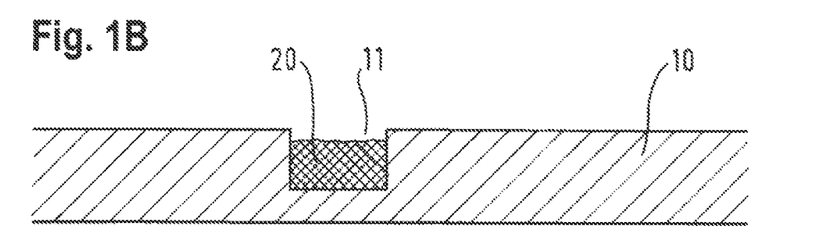
Figure 1C:
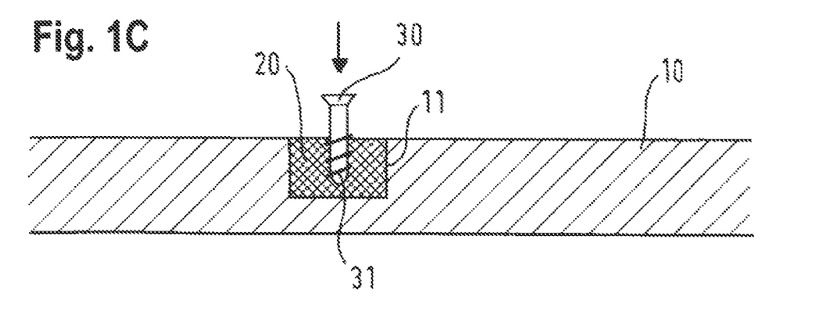

The cutout 11 thereby has a larger cross-section than the part of the engagement element 30 which is to be introduced into the cutout (see FIG. 1C). It is thereby preferred that the volume of the cutout 11 is marginally larger than the part of the engagement element 30 which is to be arranged in the cutout. This ensures an appropriate displacement of the filling compound 20 when the engagement element 30 is pushed into the filling compound 20 that is in the cutout 11.

By introducing the engagement element 30 into the filling compound 20, the engagement element 30 occupies a predetermined position relative to the workpiece. A case is presently depicted here in which the engagement element is arranged perpendicular to the surface of the workpiece. However, arbitrary inclined orientations are conceivable as well.

After the hardening of the filling compound 20, the engagement element 30 is then essentially solidly arranged in the predetermined position relative to the workpiece.

In the case of the screw depicted in the drawings as engagement element 30, the workpiece 10 together with the screw can now be packed into a construction kit. At the location of assembly, the user must only unscrew the screw 30 from the hardened filling compound 20 in which an inner thread (engagement portion) is formed by the pushing in and hardening. Afterwards, the workpiece 10 can be connected to a suitable counterpart (for example, a further workpiece having a corresponding through hole) in that the screw (engagement element) is screwed (introduced) back into the inner thread (engagement portion) formed in the workpiece.

This process is characterized both by a very high connection precision as well as by an especially simple operation since the user can revert to a thread (engagement portion) which has already been formed, and does not have to firstly cut (form) a thread (engagement portion) into the workpiece with greater physical effort. Additionally, other screws, and not only particle board screws, can also optionally be used which where necessary ensure higher resistances to being "ripped out" or "pulled out" or "broken out".

To support a precise assembly, the predetermined volume V of the filling compound 20 that is filled into the cutout 11 is preferably measured so that it essentially corresponds to the volume of the cutout 11 minus the volumetric displacement of the engagement element 30. This is depicted, for example, in the transition from FIG. 1B to FIG. 1C. If the engagement element is then pushed into the filling compound, the filling compound is essentially closed flush with the edge of the workpiece (see FIG. 1C). A possible reworking is not necessary. Additionally, as regards the predetermined volume, the amount which penetrates into the workpiece when the engagement element is pushed into the workpiece can be taken into account. This amount can be correspondingly added to the predetermined volume.

However, different volumes can also be advantageous for several embodiments. For example, overfilling the filling compound can lead to the filling compound protruding from the edge of the workpiece 10, by which it could fulfil the function of a "washer" or a spacer element.

Conversely, a volume V that is smaller than the volume of the cutout 11 minus the volumetric displacement of the engagement element 30 can safely ensure that the engagement element can be sunk into the cutout and that a portion of the hardened filling compound 20 does not protrude beyond the edge of the workpiece 10.

To support the correct arrangement of the engagement element 30 in the predetermined position in the hardened filling compound 20, it is furthermore preferred in step 1C to hold the engagement element 30 in the predetermined position until the filling compound 20 is at least partially hardened.

In this connection, it is furthermore preferred that the viscosity of the curable, not-yet-hardened filling compound 20 be formed such that it is possible to easily push in the engagement element 30, however, a lateral shifting or a tipping of the engagement element 30 is made more difficult.

Regarding the material of the filling compound 20, it is preferred that the material is a thermoplastic compound which transforms into a thermoplastic state when heated and hardens when cooled.

Here, it is preferably heated to a temperature of 180° C. to 220° C.

Accordingly, a filling compound 20 having suitable properties can be provided in that the thermoplastic filling compound 20 is heated before introduction into cutout 11. Hardening the filling compound by cooling after the engagement element 30 has been introduced is commonly performed without an additional processing step, alone by the cooling of the softened material by the cooler ambient air. The cooling of the filling compound can, however, also be supported by a determined cooling step. This can, for example, comprise blowing cooled air.

Especially preferred is a filling compound 20 which has a biopolymer that is characterized by biodegradability and is essentially biologically based in that it is produced, for example, from sugar by fermentative and polymer-chemical processes. In particular, the biopolymer has lignin. Moreover, natural resins, natural waxes, natural oils, cellulose, and natural reinforcing fibers such as, for example, wood fibers, flax fibers, hemp, sisal, jute or other plant fibers can be contained in the material. Moreover, the material of the filling compound can have polyhydroxyalkanoates, polyhydroxybutyrates, polycaprolactone, polyester and/or starch. In particular, biodegradable thermoplastics or thermoplastic polyesters are used as the thermoplastic part such as, for example, polyhydroxyalkanoates, polyhydroxybutyrates, and polycaprolactone.

Furthermore, further advantages to these materials are good biodegradability and the opportunity for a resource-saving production. Thus, it is even conceivable that wood dust or wood flour from a previous processing step is used for the filling compound. Furthermore, with regard to a recycling process when disposing of the furniture, the filling compound does not need to be taken into account.

Furthermore, the filling compound 20 can also be formed such that it is hardened by a supply of energy. Thus, for example, a filling compound 20 which is cross-linked by heat (chemically) is conceivable. The filling compound then preferably has two components, a basic compound and a cross-linker, with the cross-linking reaction being activated by heat. The required heating is then, for example, in a region of approximately 195° C. After introducing the engagement element 30, the filling compound 20 can then, for example, be hardened by radiation with infrared energy or (laser) light or exposure to ultrasound energy.

A workpiece produced by the method depicted in FIGS. 1A to 1C is characterized by a cutout which is filled in with a hardened filling compound 20 in which in turn an engagement portion is formed that is engaged with an engagement structure of an engagement element. The engagement portion is the geometric counterpart (negative) to the engagement structure and the engagement essentially occurs in a complete form fit.

If the screw 30 depicted in the drawings is used as the engagement element, an arrangement is formed in which the engagement element 30 can only be removed from the workpiece 10 with great difficulty by pulling on the engagement element.

Experiments with an M8 screw and a particle board showed that the arrangement according to the invention withstands tensile forces which would greatly exceed the strength of common dowel connections. Usually such tensile tests ended with the destruction of the particle board—and not for instance with a failure of the hardened filling compound or the hardened filling compound being torn out of the workpiece. This underpins the advantage in strength that can be achieved with the method according to the invention.

Feeding a granulate of wood-like material, in particular a mixture of biodegradable polymers and natural fibers, into an extruder has proven an effective method for introducing the filling compound into the cutout 11. The granulate is then melted down in the extruder to form the curable (not-yet-hardened) filling compound which then hardens again when cooled.

In this application, the method according to the invention was described with a screw as an example of an engagement element. However, other engagement elements are also still conceivable here. For example, a hook which has an outer thread on one end is imagined. Engagement elements are also conceivable which have (circumferential) grooves, or projections (in particular circumferential ring-shaped projections). If these are suitably dimensioned and if the elasticity of the hardened filling compound 20 is correspondingly adjusted, the engagement element can be detached from the workpiece by pulling on the engagement element after the hardening of the filling compound. The reconnection then occurs by clicking the engagement element into the filling compound and latching the engagement structure into the engagement portion of the hardened filling compound.

In any case, after the final processing of the workpiece with the method according to the invention, the engagement element can firstly remain in the engagement portion in the filling compound 20 and thereby in the workpiece 10. For the furniture construction kit, plural of such workpieces 10 can optionally be assembled into packages and correspondingly sent.

However, in this case as well as with the storage of such a workpiece 10, a protruding engagement element 30 (see FIG. 1C) can be disadvantageous.

Figure 2A:
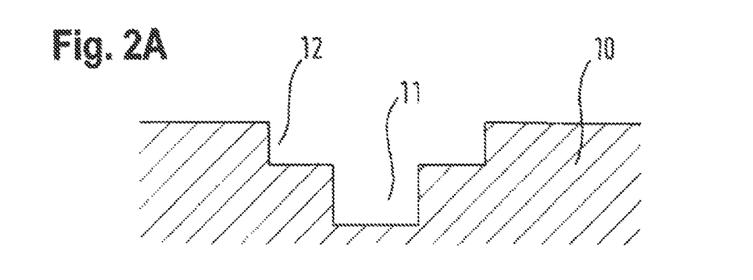
FIGS. 2A to 2E depict further embodiments of the method according to the invention with the help of cross-sections.

In such cases, it is preferable that an indentation 12 depicted in FIG. 2A is formed around the cutout 11 in the workpiece. In doing so, a blind hole is formed in which the part of the engagement element 30 that is protruding from the actual cutout 11 can be accommodated such that the engagement element 30 does not protrude beyond the workpiece 10. The indentation 12 and the cutout 11 are then dimensioned such that the engagement element 30 in the predetermined position does not protrude beyond the contour A of the workpiece 10. A screw head of a screw 30 can thus be sunk, for example, into the workpiece 10 for transportation.

In FIG. 2A, the indentation 12 is depicted in cross-section as a depression that is cuboid. However, the depression can also be conical in the cross-section and having diagonal side walls (see FIG. 2C).

Figure 2B:
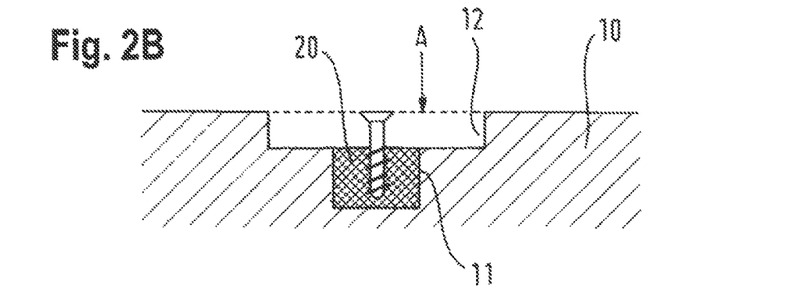
Figure 2C:
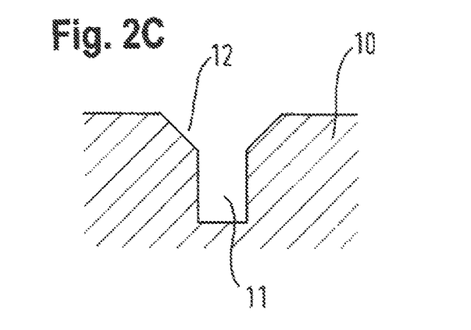

Thus, a workpiece such as depicted in FIG. 2B is characterized in that the workpiece has a cutout 11 which is filled with a hardened filling compound 20 which in turn has an engagement portion with which an engagement element is engaged via an engagement structure formed thereon. The engagement portion is thereby the counterpart (negative) to the engagement structure and the engagement essentially occurs in a complete form fit. Furthermore, an indentation 12 is formed around the cutout 11 that is dimensioned such that the indentation 12 can accommodate at least the part of the engagement element 30 that is protruding from the cutout 11 in such a way that it does not protrude beyond the contour A of the workpiece 10.

Figure 2D:
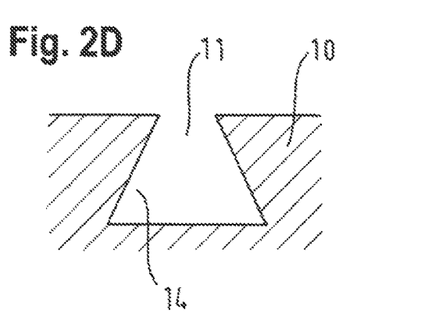
Figure 2E:
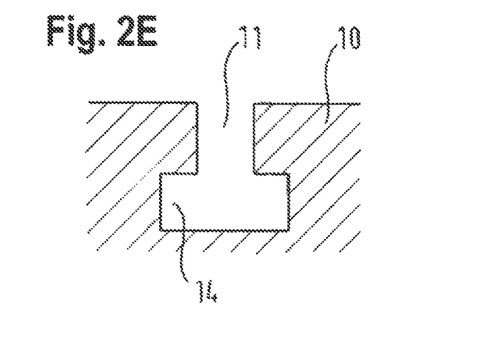

To further support the meshing between the filling compound and the workpiece, the cutout, as shown in FIGS. 2D and 2E, can have an undercut 14 relative to the pushing-in direction of the engagement element. In other words, on a portion which faces away in the pushing-in direction of the engagement element from that side which the engagement element is pushed in, the cutout has an area which has a larger inner diameter than the portion of the cutout from which the engagement element is pushed in. Such an undercut 14 can be formed in the cutout in the shape of a reversed countersunk drill hole (FIG. 2D) or a step portion at the transition to a portion having enlarged diameter (FIG. 2E).

In the above-mentioned method, the filling compound can alternatively be introduced into the cutout 11 in a "raw state", for example, in the form of a granulate or a pre-shaped body. The filling compound is formed thereby such that it can be transformed from this raw state into the not-yet-hardened state to form the curable filling compound, in particular by an energy supply. In doing so, after introducing the filling compound in the raw state, the filling compound can subsequently be transformed in the cutout 11 into the not-yet-hardened state. This can occur, for example, by heating the filling compound or by exposing the workpiece to ultrasound, with ultrasound electrodes which are not shown then being applied to the workpiece. As alternatives, a heating can be provided in particular by hot air, laser radiation and microwaves, which (optionally with ultrasound exposure) can also be used in combination. In the case of laser radiation or microwaves, this can furthermore be supported by the addition of polymers which deliberately absorb the form of energy.

An example of a device for performing the method according to the invention is described below with reference to FIG. 3.

The device has a jig 120 for the workpiece 10. Furthermore, the device has a tool holder 130 in which different tool heads 101, 110 and 140 can be accommodated.

These tool heads comprise, for example, a drilling/milling device 110 to form a corresponding cutout 11 (optionally including an indentation 12) in the workpiece 11. Furthermore, the device has a holding device 140 as a tool head for picking up, holding and subsequently putting down the engagement element 30.

A further tool head is provided by the application unit 101, with which the filling compound 20 can be introduced into the cutout 11. In the shown example, the application unit 101 has an extruder 103 which preferably feeds granular raw material into an outlet opening 102 by heating. The raw material for the filling compound can thereby be stored in a storage container 105 which is connected to the extruder 103 by a hose 104.

Figure 3:
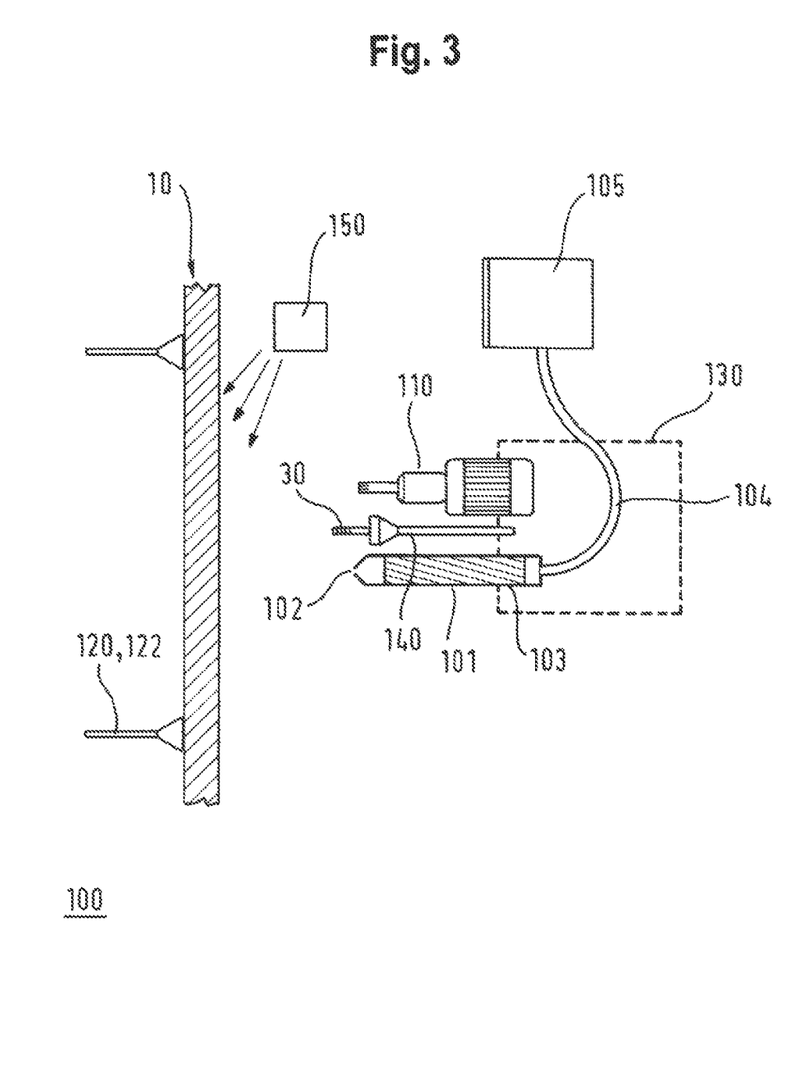
FIG. 3 depicts in a simplified form of one preferred embodiment of a device, with which the method according to the invention can be performed.

For a simplified representation, these tool heads 101, 110 and 140 are depicted on top of one another in the device shown in FIG. 3. However, it is noted that these can be accommodated in the tool holder 130 with the help of a magazine which permits a cycling of the tool heads. Furthermore, the tool holder 130 can also be formed such that for each method step it also takes an individual tool head from a separate magazine and returns this tool after finishing the corresponding step.

The tool holder 130 preferably has a spindle unit to drive the drilling/milling tool and the extruder 103.

Furthermore, it is preferred that the tool holder 130 is realized as a so-called "five-axes tool holder" which can be driven and oriented in five directions relative to the workpiece being held by the jigs 120. These directions can relate to longitudinal shifts along the three spatial directions as well as rotational movements around two independent axes. For example, known structures such as systems having a five-axis spindle head and the like can be used for this. Overall, such an embodiment has the advantage that the cutouts 11 can formed in diverse geometries and locations on the workpiece 10, and the filling compound 20 as well as the engagement elements 30 can also be flexibly introduced or inserted. Alternatively/additionally, with a suitable device it can also be provided to move the workpiece 10 relative to a tool holder.

Furthermore, the device can have energy sources 150 which are formed such that they apply energy to the filling compound. This can, for example, be used to harden the filling compound after introduction of the engagement element or for transforming the filling compound from a raw state into a not-yet-hardened but curable state (which can then be hardened).

Such energy sources can, for example, consist of infrared radiation application devices, microwave application devices or ultrasound application devices.

Furthermore, the device can also have a control unit that is not shown, which is formed such that it firstly controls the forming of a cutout 11 having a certain volume in the workpiece 10 and then, on the basis of this volume of the cutout, calculates the predetermined volume of the filling compound 20 that is to be introduced into the cutout 11, with the predetermined volume V preferably being adjusted such that this corresponds to the volume of the cutout 11 minus the known volumetric displacement of the engagement element 30 that is to be introduced into the filling compound 20.

The porosity of the workpiece can also additionally be taken into account here. Since the filling compound penetrates into the pores of the workpiece, an additional amount is to be added to the volume calculated above, depending on the porosity of the workpiece.

As an alternative to the above-described five-axes tool holder 130, the device can also be constructed such that the tool holder 130 can only be shifted in an X-, Y-, and Z-direction relative to the workpiece 10 that is being held by the jigs 120. Additionally, the workpiece 10 can also be transported relative to the tool carrier 130 by a not shown conveyor to perform the method according to the invention in throughfeed.

It is possible with the above-described device and said variations to simply perform the method according to the invention for forming an engagement portion in a workpiece.

In FIG. 4, several possible embodiments are schematically shown once more in this regard in cross-section. FIG. 4A shows a cutout 11 having the indentation 12, after the curable filling compound has been introduced. The amount or the volume of the filling compound 20 can be measured such that the indentation 12 is essentially completely filled out with engagement element 30 and the displaced filling compound 20 after the engagement element 30 is introduced (FIG. 4B). Alternatively, the volume of the filling compound 20 can also be adjusted so that only a small amount of the displaced filling compound oozes into the area of the indentation 12 (FIG. 4C).

Figure 4A:
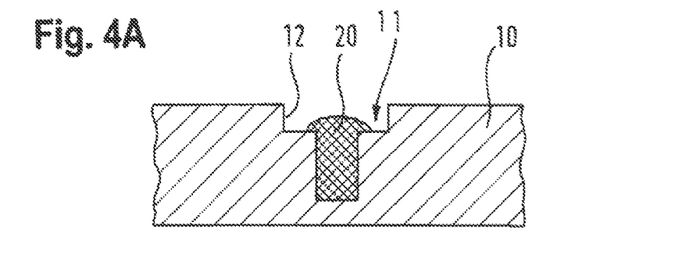
FIGS. 4A to 4D depict further embodiments in the form of cross-sections.
Figure 4B:
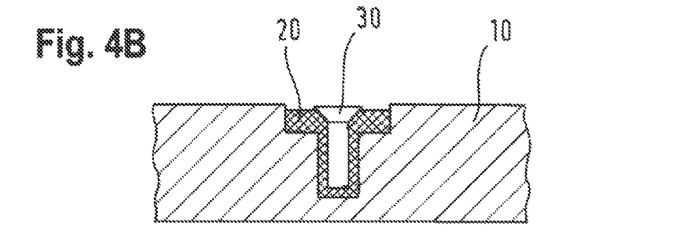
Figure 4C:
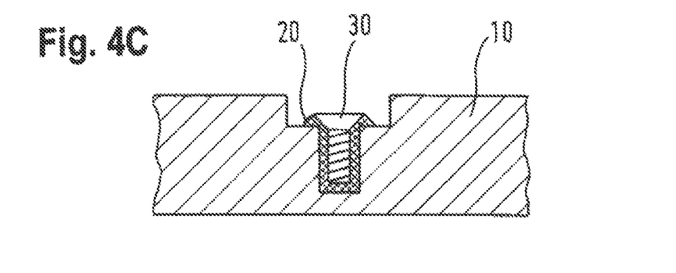
Figure 4D:
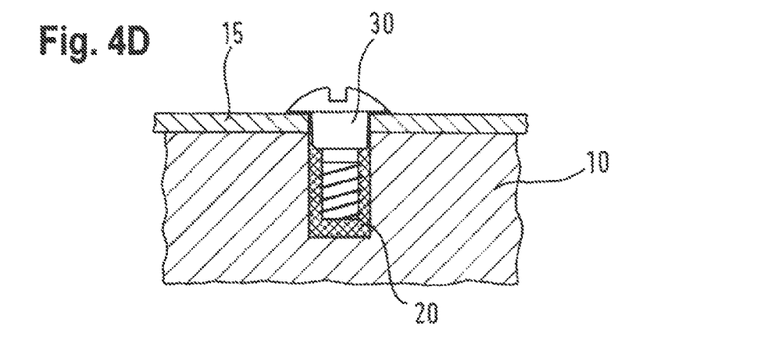

Lastly, one embodiment is shown in FIG. 4D which once more emphasizes the versatility of the method. Here, a screw as the engagement element 30 holds a cladding layer 15 to the workpiece 10. In doing so, the engagement element 30 is realized as a head screw which is guided through a corresponding through hole of the cladding layer 15. During the production, it is conceivable to prepare the cladding layer 15 together with the engagement elements 30 that are disposed thereon and to then press it onto the workpiece 10 as a whole such that the engagement elements 30 penetrate into the cutouts 11 in the workpiece 10, which are filled with the not-yet-hardened filling compound 20. After curing the filling compound, the cladding layer 15 is securely attached to the workpiece 10. A screwing of the workpiece 10 with the cover layer 15 that had conventionally been required is no longer necessary.

As a result of the fact that an engagement element, the engagement structure thereof is to some extent a negative or geometric counterpart of the engagement portion to be formed in the filling compound (or the workpiece), is pushed into a curable filling compound that is poured into a cutout 11 of the workpiece 10, a processable workpiece can be provided after the hardening of the filling compound, which is particularly suited for further use in furniture construction kits and is characterized by a secure and simple connection to an engagement element.

What is claimed is:

1. A method for forming an engagement portion in a workpiece, the workpiece comprising any of wood, materials containing wood fibers, wood composite materials, veneer, plastic materials, and combinations thereof, the method comprising the steps of:
   providing the workpiece with a cutout;
   introducing a predetermined volume of a curable filling compound into the cutout; and
   pushing an engagement element having an engagement structure into the curable filling compound such that the engagement structure is at least partially disposed in the filling compound,
   wherein a connection between the curable filling compound and the engagement element is a form-fit connection, and
   wherein the engagement element is unscrewed from the hardened filling compound and afterwards the engagement element is screwed back into the engagement portion formed in the workpiece.

2. The method of claim 1, comprising holding the engagement element in a predetermined position for a predetermined period of time after the filling compound is introduced.

3. The method of claim 1, wherein the predetermined volume corresponds to a volume of the cutout minus a volumetric displacement of the engagement element in the filling compound.

4. The method of claim 1, wherein the predetermined volume of the curable filling compound is determined by a porosity of the workpiece.

5. The method of claim 1, wherein the curable filling compound comprises a paste-like compound.

6. The method of claim 1, wherein introducing the filling compound comprises:
   feeding a granulate comprising a wood material to an extruder; and
   melting the granulate in the extruder to form the curable filling compound.

7. The method of claim 1, wherein the curable filling compound comprises a thermoplastic compound which transforms into a thermoplastic state when heated and hardens when cooled, and comprising heating the curable filling compound before or during introduction into the cutout.

8. The method of claim 1, wherein the curable filling compound can be hardened by a supply of energy, and comprising hardening the curable filling compound by a supply of energy.

9. The method of claim 1, wherein the curable filling compound can be formed from a raw mass by a supply of energy, and comprising:
   introducing the raw mass into the cutout; and
   transforming the raw mass located in the cutout into the curable filling compound by the supply of energy.

10. The method of claim 1, wherein the curable filling compound comprises biological polymers, comprising any of lignin and natural fibers, wherein the natural fibers are formed from any of wood, flax, hemp, sisal, jute, and/or other plant fibers.

11. The method of claim 1, wherein an indentation in the workpiece is formed around the cutout, the indentation being dimensioned such that, in the indentation, at least a part of the engagement element protruding from the cutout can be accommodated.

12. The method of claim 1, wherein the cutout comprises an undercut relative to a pushing-in direction of the engagement element.

13. The method of claim 1, wherein the engagement structure of the engagement element comprises a thread.

14. The method of claim 1, wherein the engagement element comprises a screw, the screw comprising any of a countersunk head and a round head.

15. The method of claim 14, wherein the screw comprises a self-tapping thread.

* * * * *